(12) United States Patent
Koudil et al.

(10) Patent No.: US 8,728,403 B2
(45) Date of Patent: May 20, 2014

(54) FILTRATION TRAY FOR FIXED BED REACTOR WITH A CO-CURRENT DOWN-FLOW OF GAS AND LIQUID

(75) Inventors: Abdelhakim Koudil, Lyons (FR); Christophe Boyer, Charly (FR)

(73) Assignee: IFP Energies Nouvelles, Rueil Malmaison Cedex (FR)

( * ) Notice: Subject to any disclaimer, the term of this patent is extended or adjusted under 35 U.S.C. 154(b) by 0 days.

(21) Appl. No.: 13/613,821

(22) Filed: Sep. 13, 2012

(65) Prior Publication Data
US 2013/0064727 A1 Mar. 14, 2013

Related U.S. Application Data

(62) Division of application No. 12/064,715, filed as application No. PCT/FR2006/001978 on Aug. 24, 2006, now Pat. No. 8,329,974.

(30) Foreign Application Priority Data

Aug. 26, 2005 (FR) ...................................... 05 08845

(51) Int. Cl.
*B01J 8/04* (2006.01)
*B01D 24/12* (2006.01)
*B01D 24/14* (2006.01)

(52) U.S. Cl.
USPC ........... 422/217; 210/254; 210/284; 210/289; 210/290; 210/292; 210/293

(58) Field of Classification Search
USPC .................. 210/111, 254, 284, 286, 289–293; 422/217
See application file for complete search history.

(56) References Cited

U.S. PATENT DOCUMENTS

| 207,337 | A | * | 8/1878 | Austin ........................... 261/98 |
| 3,112,256 | A | | 11/1963 | Young et al. |
| 3,524,731 | A | | 8/1970 | Effron et al. |
| 3,607,000 | A | | 9/1971 | Beal et al. |
| 3,702,238 | A | | 11/1972 | Kosiba et al. |
| 3,824,081 | A | | 7/1974 | Smith et al. |
| 3,888,633 | A | * | 6/1975 | Grosboll et al. ............... 422/217 |
| 3,958,952 | A | | 5/1976 | Van Ginneken et al. |
| 4,126,540 | A | | 11/1978 | Grosboll et al. |
| 4,239,614 | A | * | 12/1980 | Hutchings ..................... 208/108 |
| 4,385,033 | A | | 5/1983 | Gupta |
| 4,740,300 | A | | 4/1988 | Tapella et al. |
| 5,232,283 | A | | 8/1993 | Goebel et al. |
| 5,389,343 | A | | 2/1995 | Gentry |
| 5,601,797 | A | | 2/1997 | Gentry |
| 6,064,242 | A | | 5/2000 | Yoshiba |

FOREIGN PATENT DOCUMENTS

| FR | 1495081 | A | * | 9/1967 |
| FR | 2308397 | A | * | 11/1976 |

* cited by examiner

*Primary Examiner* — Matthew O Savage
(74) *Attorney, Agent, or Firm* — Millen, White, Zelano & Branigan, P.C.

(57) ABSTRACT

The device described in the present invention can trap plugging particles contained in the liquid feed supplying a reactor functioning in gas and liquid co-current down-flow mode using a specific distributor tray comprising a filtration medium. The present device is of particular application to the selective hydrogenation of feeds containing acetylenic and dienic compounds.

17 Claims, 2 Drawing Sheets

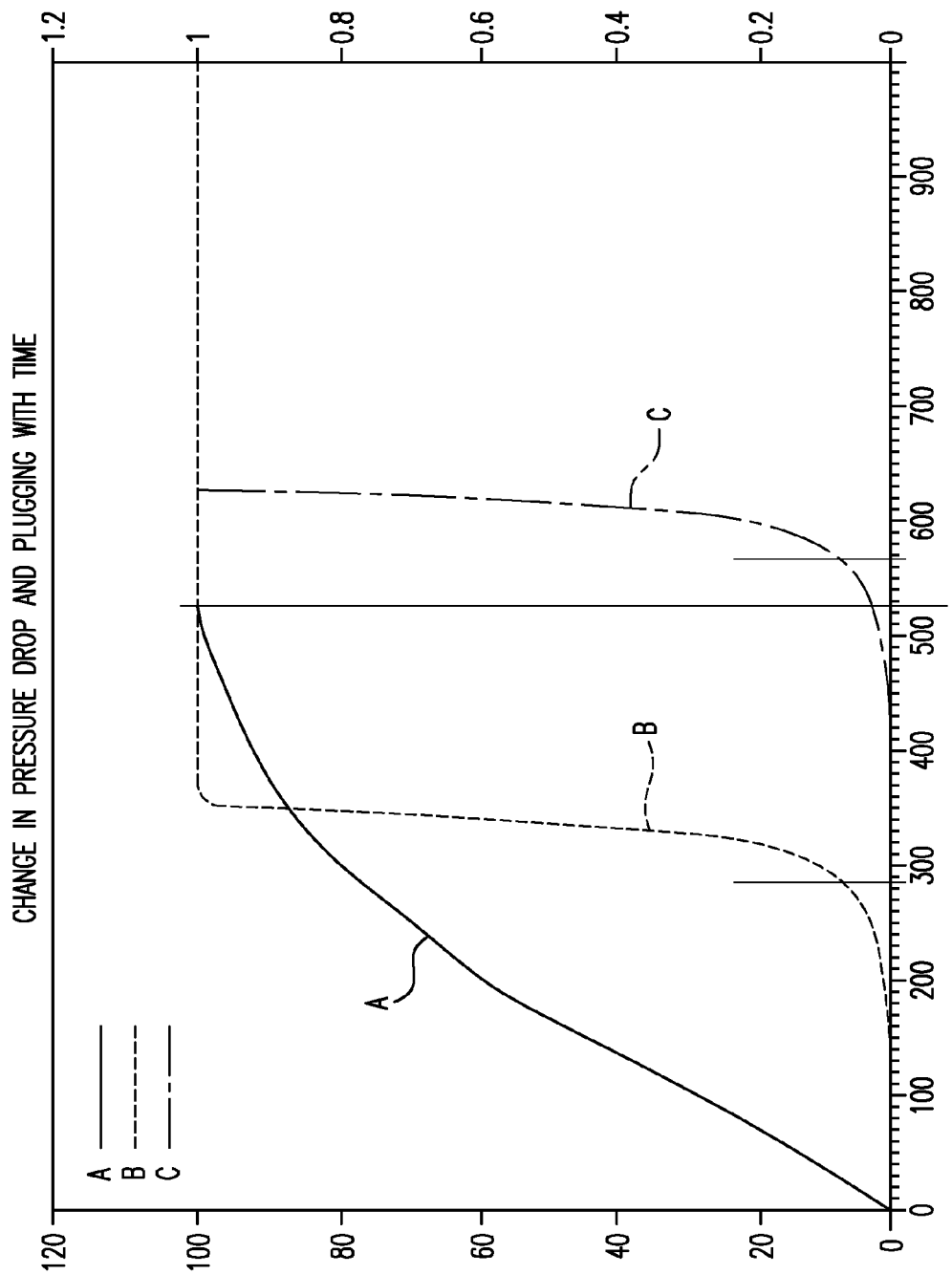

FILTRATION TRAY FOR FIXED BED REACTOR WITH A CO-CURRENT DOWN-FLOW OF GAS AND LIQUID

This application is a divisional application of U.S. Ser. No. 12/064,715, filed Feb. 25, 2008, now pending. This application claims the benefit of priority to France Application No: 05/08.845, filed Aug. 26, 2005.

FIELD OF THE INVENTION

The invention relates to the field of distributor trays intended to supply chemical reactors functioning in gas and liquid co-current down-flow mode with gas and liquid.

Such reactors are encountered in the refining field, more particularly in the selective hydrogenation of various oil cuts, and more generally in hydrotreatments which require high pressure hydrogen streams operating with heavy liquid feeds which may contain impurities constituted by plugging solid particles.

In some cases, the liquid feed contains impurities which may be deposited on the catalytic bed itself and over time may reduce the interstitial volume of that catalytic bed.

Plugging feeds which may be cited include mixtures of hydrocarbons containing 3 to 50 carbon atoms, preferably 5 to 30 carbon atoms, which may contain a non-negligible proportion of unsaturated or polyunsaturated acetylenic or dienic compounds or a combination of those various compounds, the total proportion of unsaturated compounds possibly being up to 90% by weight in the feed. A representative example of feeds which are of relevance to the present invention is pyrolysis gasoline, "pyrolysis" designating a thermal cracking process which is well known to the skilled person.

A description of that type of process and the corresponding products can be found in the work entitled "Raffinage et Génie Chimique" [Refining and Chemical Engineering] by P Wuithier, Editions Technip, page 708.

The present invention allows for limiting the deposition of plugging particles in the catalytic bed.

It thus contributes to keeping the bed homogeneous as regards the void fraction and thus the flow quality, and it allows also for limiting the increase in pressure drop.

When a blockage occurs in a catalytic bed, the pressure drop in the flow through the reactor is observed to rise very rapidly.

The pressure drop may become such that the operator is obliged to shut down the reactor and replace all or part of the catalyst, which clearly considerably reduces the run times of the process.

Blockage of part of the catalytic bed may be due to a number of mechanisms.

Directly, the presence of particles in the feed stream may cause a blockage by deposition of said particles in the catalytic bed, this deposition effectively reducing the void fraction.

Indirectly, the formation of a layer of products derived from chemical reactions, typically coke, but possibly other solid products derived from the impurities present in the feed, which products are deposited at the surface of the catalyst grains, may also contribute to reducing the void fraction of the bed.

Further, the plugging particles may be deposited in the bed in a more or less random manner and result in heterogeneities in the distribution of the void fraction of that bed which result in the creation of preferred pathways.

Such preferred pathways are major problems from the hydrodynamic viewpoint as they can substantially perturb the homogeneity of flow of the phases in the bed and may contribute to heterogeneities in the progress of the chemical reaction, as well as thermal considerations.

EXAMINATION OF THE PRIOR ART

U.S. Pat. No. 3,702,238 proposes a system of conduits provided with calibrated breakage disks which are intended to deflect part of the flow of reagents when the catalytic bed becomes plugged. The increase in pressure ruptures the breakage disk and allows the feed to flow through the conduits.

The instantaneous effect of deflecting part of the flow through the conduits is a large reduction in the pressure drop. The inlet to the conduits is located upstream or downstream of a distributor tray, but no system is provided for deflecting the liquid flow and the gas flow in a controlled or independent manner.

No re-distribution device is provided in this case to homogenize the flow at the outlet from the conduits. This device also suffers from the disadvantage of being sensitive to sudden pressure variations.

U.S. Pat. No. 3,607,000 and FR-A-7513027 propose systems composed of filter baskets placed upstream or at the head of the catalytic bed to collect impurities transported by the flow of reagents. In this case, a non-negligible volume of the bed is occupied by said baskets which do not actually prevent fouling of the fractions of the bed located between the baskets. Further, for gas/liquid flow applications, the system cannot control a homogeneous distribution of the gas/liquid flow between the baskets and downstream of the baskets.

In the article by T H Lindstrom et al in Hydrocarbon Processing, February 2003 (pages 49-51), a system of external filters is described, but that system does not overcome all types of blockage and the cost of that solution is very high.

U.S. Pat. No. 4,313,908 or EP-A2-0 050 505 describe devices which can reduce the increase in the pressure drop in the catalytic bed by deflecting part of the flow through tubes. A series of tubes forming a short-circuit pass through the catalytic bed. The inlet to those tubes is located downstream of a distributor tray and the outlet from those tubes opens above the inlet to the catalytic bed at various levels, The system can thus independently deflect the gas and liquid flows provided that a liquid level is established upstream of the bed. The device described in the cited patents cannot control the ratio between the liquid flow and the gas flow deflected into the tubes composing said system. The gas will be deflected from start-up of the reactor and the liquid will only be deflected when a sufficient liquid level has been established above the bed because of fouling.

Further, there is no fluid distribution effect at the outlet from the devices described in the two cited patents, necessitating the downstream provision of a distributor tray or an equivalent system. In the case of the present invention, the distribution function is incorporated into the filtration system to form a single device.

The more recent patent application WO-A1-03/000401 describes a device using tubes forming a short-circuit coupled with chambers also forming a short-circuit and acting to capture any impurities contained in the feed. That device does not include an effective system for re-distribution of gas/liquid effluents at the outlet from said chambers when the system is used in gas/liquid flow mode.

The tray of the invention in U.S. Pat. No. 3,958,952 is constituted by a series of filtration units each being constituted by alternating concentric chambers, one empty and the other occupied by "filtration bodies" which are not described in detail.

In such a system, the filtration function is completely separate from the mixing and distribution function, while in the device of the present invention, there is genuine synergy between the filtration bed and the mixing chimneys, as will be explained below.

In fact, the filtration bed directly integrated with the tray has a secondary function of stabilizing the gas/liquid interface located above the tray, and thus contributes to a uniform supply of liquid to the mixing and distribution chimneys which form an integral part of said tray.

U.S. Pat. No. 4,229,418 describes a tray system comprising filtration elements, but the term "filtration" in the context of that patent means permeability with respect to the process fluids and impermeability with respect to the catalyst particles, while in the context of the present invention, the term "filtration" means the capacity to retain plugging particles contained in the feed.

Finally, the device described in the present invention is remarkably compact, in contrast to that of the prior art, and thus means that more catalyst can be used in a given volume of reactor, thereby increasing its efficiency.

BRIEF DESCRIPTION OF THE FIGURES

FIG. 2 shows curves of the change, as a function of time, in the quantity of deposited impurities (curve A), of the pressure drop through a catalytic bed without a filtration bed (curve B) and of the pressure drop through a catalytic bed with a tray of the invention, i.e. provided with a filtration bed.

BRIEF DESCRIPTION OF THE INVENTION

Figure 1:
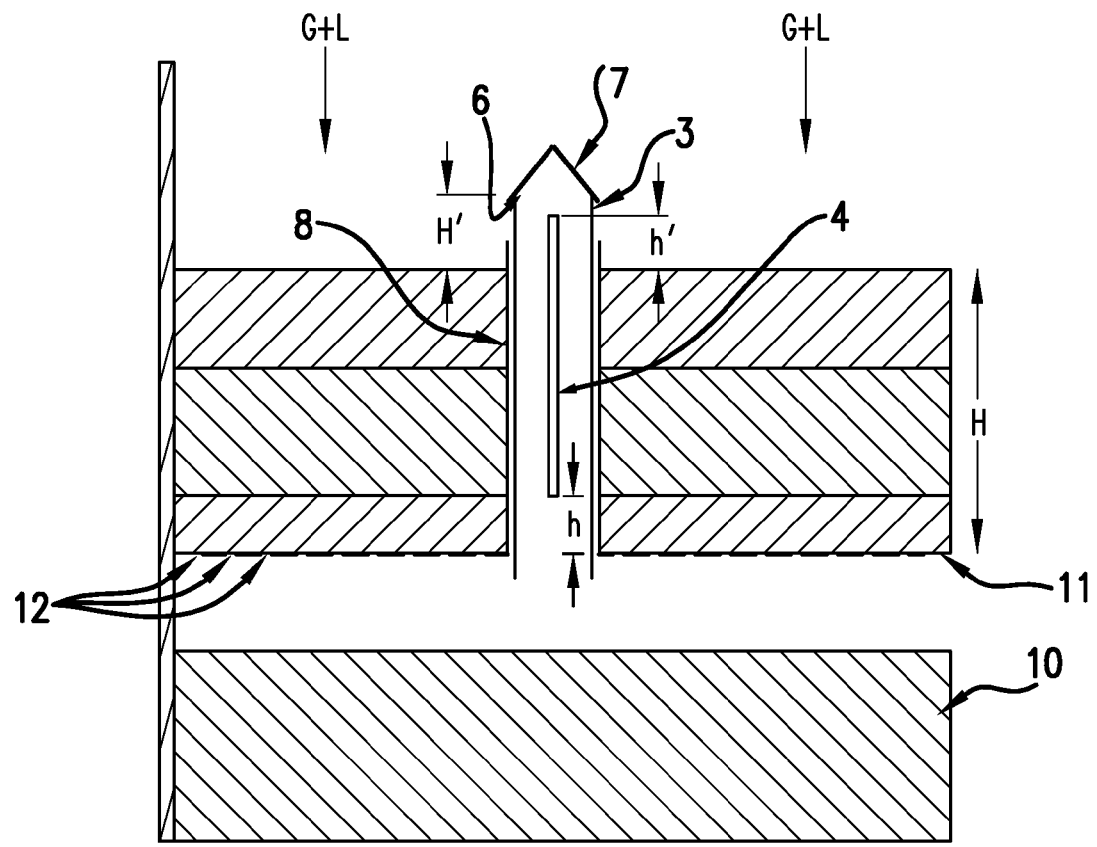
FIG. 1 represents a diagram of a filtering distributor tray of the invention, said tray being placed upstream of a catalytic bed supplied with a feed having a gas portion and a liquid portion.

The device described in the present invention can trap plugging particles contained in the liquid flow constituting part of the feed for a reactor functioning in gas and liquid down-flow co-current mode by means of a specific distributor tray comprising a filtration medium.

The present invention consists of a device which can simultaneously distribute the gas phase and the liquid phase supplying a fixed bed reactor functioning with a down-flowing co-current of said phases, while ensuring a filtration function for impurities contained in the liquid phase constituting a portion of the feed to be treated.

More precisely, the device of the invention is a device for filtering and distributing a gas phase and a liquid phase constituting the supply to a reactor comprising at least one fixed catalyst bed, functioning in a gas and liquid down-flow co-current mode, the liquid phase generally being charged with plugging particles, said device comprising a tray located upstream of the catalytic bed, said tray being constituted by a substantially horizontal base plane which is linked to the walls of the reactor and to which substantially vertical chimneys are fixed which are open at their upper end to admit gas and at their lower end to evacuate the gas-liquid mixture for supplying the downstream catalytic bed, said chimneys being perforated over a certain fraction of their height by a continuous lateral slot or lateral orifices for the admission of liquid, said tray supporting a filtration bed surrounding the chimneys and said filtration bed being constituted by at least one layer of particles with a size which is less than or equal to the size of the particles of the catalytic bed.

Said filtration bed, which forms part of the distributor tray, is generally composed of a plurality of layers of particles of different sizes.

The particles composing the various layers of the filtration bed are generally inert and usually formed from silica or alumina, or any other ceramic substance.

In certain cases however, it may be advantageous for at least one layer of the filtration bed to be composed of particles which are active in the sense of the chemical reaction which takes place on the catalytic bed located downstream of the filtering distributor tray. In this case, the active particles are preferably composed of an identical catalyst or one belonging to the same family as the catalyst in the catalytic bed.

In a further variation of the device of the invention, the filtration bed is composed of a packing structured with a porosity in the range between 35% to 50% (0.35 to 0.50).

To prevent blockage of the lateral orifices of the chimneys or the lateral slot, each chimney is generally separated from the filtration bed which surrounds it by means of a screen with a sufficiently fine mesh, i.e. a mesh size which is lower than that of the particles of the filtration bed. In this case, the distance separating the chimney from the filtration bed is generally in the range from 5 mm to 20 mm.

The filtration and distribution device of the invention is thus a filtering distributor tray with a base plane supporting the chimneys and the filtration bed which is preferably provided with orifices, with an orifice density of more than 100 orifices per $m^2$ section of reactor.

The filtration and distribution device of the present invention can significantly extend the service life of the catalyst. In general, periodic replacement of the filtration bed is carried out with a periodicity of at least 6 months.

The filtration and distribution device of the invention is particularly advantageous for use in hydrotreatment reactors, selective hydrogenation reactors or in the conversion of residues or hydrocarbon cuts with an initial boiling point of more than 250° C.

DETAILED DESCRIPTION OF THE INVENTION

The device of the present invention is composed of a distributor tray comprising a substantially horizontal base plane which is integral with the walls of the reactor, on which are fixed a set of substantially vertical chimneys provided with an upper opening and a lower opening and perforated with lateral orifices distributed all along their vertical walls.

The gas portion of the supply penetrates into the inside of the chimneys essentially via the upper opening, and the liquid portion of the supply penetrates into the inside of the chimneys essentially via the lateral orifices. The term "essentially" means that at least 50%, preferably at least 80% of the gas and liquid respectively penetrate into the inside of the chimneys via the upper opening and via the lateral orifices.

The gas and liquid are mixed inside the chimneys and the resulting mixture leaves the chimneys via the lower opening.

The lateral orifices may form a continuous slot extending over the major portion of the height of the chimneys. The remainder of the text will refer to lateral orifices, but this will encompass the case of a continuous slot.

The distributor tray supports a filtration bed constituted by at least one granular solid acting as a filter, said solid granular bed surrounding each of the chimneys over a fraction of their height.

The chimneys are generally higher than the level of the filtration bed by a height (H') of at least 30 mm, preferably more than 35 mm, or even more than 40 mm.

The filtration bed may comprise a plurality of layers of particles of any shape.

The size of the particles constituting each layer of the filtration bed reduces from the top to the bottom of the filtration bed.

The particles of the lower (or the lowest) layer has a mean size which is preferably smaller than the size of the particles of catalyst constituting the catalytic bed located downstream of the distributor tray.

In general, the size of the particles in each layer varies between 1 and 30 mm, preferably between 1 and 20 mm.

In a variation of the filtration and distribution device of the invention, the filtration bed is composed of at least two layers of solid particles, the size of the particles of a given layer being smaller than that of the particles of the immediately superior layer.

In a particular variation of the device of the invention, the size of the particles of the upper layer of the filtration bed is in the range from 5 mm to 30 mm, and the size of the particles of the lower layer is in the range from 2 mm to 10 mm.

Purely by illustration, and without constituting any limitation, a filtration bed of the device of the invention may be constituted by:
- an upper layer representing 25% of the total height of the filtration bed and composed of particles with a size which is greater (preferably by at least 10%) than that of the catalyst grains;
- an intermediate layer representing 25% of the total height of the filtration bed, and composed of particles with a size approximately equal to that of the catalyst grains;
- a lower layer representing 50% of the total height of the filtration bed and composed of particles with a size lower (preferably by at least 10%) than that of the catalyst grains.

The particles forming the filtration bed may have any shape, for example spherical or cylindrical, with or without void in the interior. They are generally inert, but may possibly be catalytic. In the latter case, the active particles of the filtration bed are generally constituted by a catalyst from the same family as the catalyst used in the catalytic bed located downstream of the filtration bed.

The filtration bed may also be constituted by packing elements offering a large capture surface for impurities while offering a high void fraction.

Examples of such packing elements which may be cited are inert particles composed of titanium and alumina with a cylindrical 20 mm diameter shape, in which cylindrical channels are formed.

Examples of active particles which may be cited are 10 mm diameter beads containing nickel-molybdenum or cobalt-molybdenum as well as alumina.

An example of a composition of a filtration bed using a plurality of layers is given in the detailed example following the present description.

For the majority of industrial reactors, the total height of the filtration bed is in general in the range from 200 to 1500 mm, preferably in the range from 300 to 600 mm.

The lateral orifices extend over the major portion of the height of the chimneys, but the lowest of them is preferably located at a minimum height (h) with respect to the base plane of the tray, which is preferably 50 mm above the base plane of said tray, or even 60 mm above. The "base plane of the tray" is the plane which is linked to the walls of the reactor and supporting the filtration bed.

The orifices are preferably stepped over the whole height of the chimney to the maximum height (h') which is preferably 20 mm above the upper surface of the filtration bed, or even 15 mm above.

The minimum and maximum stepped heights of the lateral orifices may also apply in the case in which a continuous slot is used.

The internal diameter of the chimneys is generally in the range from 10 mm to 150 mm, and preferably in the range from 25 mm to 80 mm.

In one preferred implementation of the invention, a separation zone surrounding each chimney avoids direct contact of the filter with the chimneys to prevent the lateral orifices or the lateral slot of the chimneys from being obscured by the solid particles or the packing elements constituting the filtration bed.

In this case, the distance separating the chimney from the filtration bed is generally in the range from 5 mm to 20 mm.

The filtration bed plugs slowly over time, starting with the lower layers, and an interface is effectively created between the lower plugged portion and the upper non-plugged portion.

The liquid passes through the filtration bed over its upper non plugged portion and penetrates through the chimneys via the lateral orifices.

The gas phase is primarily introduced into the inside of the chimneys via their upper opening.

A greater or lesser portion of the gas is also introduced via the lateral orifices of the chimneys or via the lateral slot.

The upper opening of the chimneys is generally located at a height H' above the filtration bed and is generally protected by a cap or any equivalent form which is aimed for preventing the direct introduction of liquid via said upper opening of the chimneys.

The liquid introduced via the lateral orifices or the lateral slot thus mix with the gas phase inside the chimney and the resulting mixture is evacuated from the chimneys via the lower opening then is distributed to the catalytic bed located downstream of the distributor tray.

In the remainder of the text, we shall term the ensemble of the device constituted by the distributor tray, the chimneys, and the filtration bed supported by said distributor tray the "filtering distributor tray".

The device of the present invention is thus composed of a filtering distributor tray linked to the internal cylindrical wall of the reactor and located above the catalytic bed.

When the reactor includes a plurality of distinct catalytic beds, each of these catalytic beds may be supplied with a filtering distributor tray of the invention.

In this case, the gas phase and the liquid phase supplying a given filtering distributor tray are constituted by effluents from the catalytic bed located immediately above it, to which may optionally be added a fluid introduced between two catalytic beds which in the case of hydrogenation or hydrotreatment reactions is usually a cooling fluid.

The filtering distributor tray may also be pierced through its horizontal base plane by holes of any shape so that the overall porosity due to these holes can produce a minimum height of liquid on the tray, termed the liquid trap. A filtering distributor tray without holes through its base plane will function, however, and is included within the scope of the invention.

The filtering distributor tray also supports chimneys which act to mix the gas and liquid and to route the resulting mixture towards the catalytic bed located in the zone downstream of the tray.

The density of these chimneys is in the range from 10 to 150 per m² section of catalytic bed, preferably in the range from 30 to 100 per m² section of catalytic bed.

All of the chimneys are provided with lateral orifices located at different levels stepped all the way along the vertical wall of the chimneys or a continuous longitudinal slot, allowing the liquid phase to pass inside said chimneys regardless of the level of plugging in the filtration bed.

The shape of these lateral orifices or of the lateral slot is studied to adjust it according to the variation in the liquid flow rate during the operational cycle, as will be explained below.

In the case of a lateral slot, the shape of said slot may be rectangular or triangular with the point of the triangle directed upwards or downwards.

Any shape of slot is possible as long as the conditions regarding the height of the slot are satisfied. It preferably should commence at a height (h') of at least 50 mm above the base plane of the tray and preferably extend to a height (h) of at least 20 mm above the upper level of the filtration bed.

The distribution function of the gas/liquid flow is maintained as plugging progresses since the whole set of the chimneys is always used and the liquid flow rate remains approximately identical between the chimneys, this latter being essentially conditioned by the liquid level established on the tray. Thus, the importance of establishing and maintaining a certain liquid level above the base plane of the filtration tray will be appreciated.

Further, the existence of the filtration bed contributes to stabilizing this liquid level by accommodating fluctuations in the interface between the gas and the liquid.

Thus, the liquid distribution remains under control throughout the service life of the filtration bed and the progressive use of the lateral orifices or the lateral slots distributed along the whole length of the chimneys allows the filtration bed to be used until it is completely saturated, without the pressure gradient increasing which would mean that the unit would have to be shut down.

A detailed description of the device of the invention is presented with the aid of FIG. 1 which concerns an embodiment in which the filtering distributor tray is constituted by a base plane 11 supporting a granular filtration bed 2 comprising three layers in the case of FIG. 1.

It will be recalled that a larger number of layers is perfectly possible and still falls within the scope of the present invention.

The filtering distributor tray is located in the upper portion of a reactor supplied with a gas (G) and liquid (L) in a down-flow co-current flow.

The filtering distributor tray is located upstream of a catalytic bed 10 in which a catalytic reaction occurs which employs the gas (G) and liquid (L) phases introduced at the head of the reactor.

The filtering distributor tray is constituted by a base plane 11 on which chimneys 3 provided with lateral openings 4, are fixed.

In the case of FIG. 1, the lateral openings 4 are constituted by longitudinal slots which are rectangular in shape, but they may equally be constituted by a slot with a non rectangular shape, for example triangular, or by a series of orifices of any shape distributed at different levels over the entire height of the chimneys 3.

The density of the chimneys 3 is in the range from 10 to 150 per m², preferably in the range from 30 to 100 per m². The distribution of chimneys 3 over the base plane 11 is regular and may be in a square or triangular pattern.

The shape of particles constituting the filtration bed 2 is defined so as to develop a large area facilitating the deposition of impurities while maintaining a sufficient pore volume to capture the maximum amount of impurities and increase the service life of the filter.

At the start of the cycle, a liquid level is established above the base plane 11 and the liquid flow is distributed over the whole section of the reactor through the orifices 12 located on the base plane of the tray 11.

It will be recalled that a base plane without an orifice is also possible and is encompassed in the scope of the invention, but preferably the base plane is provided with orifices, and in this case the density of the orifices located on the base plane of the tray 11 is, generally, at least equal to 100 orifices per m².

As the filtration bed 2 becomes plugged, the liquid level above the tray 11 increases and a portion of the liquid starts to flow through the rectangular slot 4 of the chimneys 3.

As plugging proceeds, the liquid level above the base plane of the tray 11 rises.

When the filtration bed is completely plugged, liquid flows through the lateral slot 4 into its portion located above the upper level of the filtration bed 2.

In all cases, gas flows through the chimneys 3 and is principally introduced via the upper openings 6, optionally provided with caps 7 to prevent liquid from being introduced via said upper openings 6.

A circular screen 8 surrounds the chimneys 3 to leave a void volume between the chimneys 3 and the filtration bed 2, so that the particles of the filtration bed 2 do not obstruct the lateral slot 4 located along the chimneys 3.

The mesh size of this screen 8 will thus be smaller than the minimum diameter of the particles of the filtration bed 2 of the distributor tray.

EXAMPLE

The following example derives from a simulation using a kinetic equation for the deposition of particles which corresponds to a linear deposition as a function of time.

The reactor had a diameter of 1 meter and a total height of 5 meters including the distributor tray and the catalytic bed. The catalytic bed was composed of particles of a traditional catalyst to carry out selective hydrogenation. It was a catalyst containing Ni deposited on an alumina support.

The particle size of the catalyst forming the catalyst bed located downstream of the distributor tray was 2 mm.

The reactor was supplied with a liquid portion and a gas portion.

The liquid was constituted by a pyrolysis gasoline with a boiling point range in the range from 50° C. to 280° C. with a mean boiling point of 120° C. under standard conditions. The gas phase was composed of 90 mole % hydrogen, the remainder being essentially methane.

The filtering distributor tray had 7 chimneys with a diameter of 50 mm and a height of 650 mm, each chimney being provided with a rectangular longitudinal slot with dimensions of 400 mm (height of slot) by 5 mm (width of slot).

The lower end of the slot began at h=50 mm above the base plane of the tray. The filtration bed was composed of 4 layers of the same thickness denoted 1, 2, 3, 4 from bottom to top. The particles were inert alumina particles sold by AXENS society.

The size characteristics of the particles and the porosity of each layer are given in Table I below.

TABLE I

Properties of particles

| Particle type | Diameter (mm) | Initial porosity of layer |
|---|---|---|
| 1st filtration tray layer | 1.0 | 0.39 |
| 2nd filtration tray layer | 1.5 | 0.41 |
| 3rd filtration tray layer | 2.0 | 0.41 |
| 4th filtration tray layer | 2.5 | 0.43 |
| Catalyst bed | 2.0 | 0.41 |

The properties of the gas and liquid under the operating conditions of the reactor are given in Table II below:

TABLE II

Properties of fluids

| | |
|---|---|
| Density of liquid (kg/m$^3$) | 710 |
| Density of gas (kg/m$^3$) | 15 |
| Dynamic viscosity of liquid (Pa · s) | 0.00085 |
| Dynamic viscosity of gas (Pa · s) | 0.00002 |
| Superficial velocity of liquid (m/s) | 0.0062 |
| Superficial velocity of gas (m/s) | 0.1000 |
| Surface tension (N/m) | 0.01 |

FIG. 2 shows the change with time:
of the quantity of impurities deposited on the filtration bed represented by curve (A). This curve was obtained using a kinetic deposition equation;
the pressure drop measured through the catalytic bed in the absence of a filtration bed, represented by curve (B);
the pressure drop measured through the catalytic bed in the presence of the filtration bed of the invention, represented by curve (C).

Curve (B) and (C) are approximately parallel, shifted with respect to time.

This time shift corresponds to gradual plugging of the filtration bed.

The plugging period extends from time t0 to time tf, which corresponds to saturation of the filtration bed marked by the flat part of the curve (A).

At time tf, curve (A) reached its flattened portion and beyond time tf, impurities contained in the liquid feed were no longer retained by the filtration bed.

with the tray without a filtration bed (prior art), the pressure drop through the catalytic bed increases sharply from time tb to a limiting value of the pressure drop which is allowable by the reactor;

with the filtration tray with its filtration bed according to the present invention, the pressure drop through the catalytic bed increases sharply from time to which is clearly shifted with respect to time tb. This tc-tb shift quantified the improvement provided by the tray of the invention since during the whole supplemental period corresponding to tc-tb, the pressure drop through the catalytic bed is practically constant, and remains the same as its value at the start of the cycle, t0.

The tray of the invention can thus extend the service life by a period equivalent to tc-tb.

In the present case, said extension is 80% compared with the cycle time with a distributor tray without a filtration bed.

The invention claimed is:

1. A device for filtering and distributing a gas phase and a liquid phase, said device comprising
   a tray constituted by a substantially horizontal base plate to which substantially vertical chimneys are fixed which are opened at their upper end to admit gas and at their lower end to evacuate a gas-liquid mixture,
   said tray supporting a filtration bed surrounding the chimneys and said filtration bed having at least one layer of particles,
   said chimneys being perforated over a certain fraction of their height by a continuous lateral slot or lateral orifices for the admission of liquid, wherein the lateral slot or the lateral orifices of the chimneys extend from a lower position located at least 50 mm above the base plate of the tray, to an upper position located at most 20 mm above an upper surface of the filtration bed.

2. The device according to claim 1, in which the filtration bed has at least two layers of particles, a particle size of a layer positioned below another layer is less than a particle size of said another layer.

3. The device according to claim 2, in which said at least two layers of particles of the filtration bed comprise an upper layer and lower layer below said upper layer, and wherein a particle size of the upper layer is in a range from 5 mm to 30 mm, and a particle size of the lower layer is in a range from 2 mm to 10 mm.

4. The device according to claim 1, in which a number density of said chimneys is in the range from 10 to 150 per m$^2$.

5. The device according to claim 1, in which a total height of the filtration bed is in a range from 200 mm to 1500 mm.

6. The device according to claim 1, in which the chimneys of the tray exceed the upper surface of the filtration bed by a height (H') of at least 30 mm.

7. The device according to claim 1, in which the filtration bed is composed of a structured packing with a porosity from 35% to 50%.

8. The device according to claim 1, in which each chimney is surrounded by a screen having a mesh size which is lower than that of the particles of the filtration bed thereby defining a separation zone around each chimney whereby each chimney is separated from the filtration bed by a distance in the range from 5 mm to 20 mm.

9. The device according to claim 1, in which the base of the tray is provided with orifices in a density of more than 100 orifices per m$^2$.

10. A reactor comprising a fixed catalytic bed of catalyst particles and a device according to claim 1 located upstream of the fixed catalytic bed.

11. The reactor of claim 10 wherein the filtration bed has at least two layers of particles and wherein at least one of the layers of the filtration bed is formed with particles which are active in a sense of a chemical reaction occurring in the catalytic bed.

12. The reactor of claim 11, wherein the base plate of the tray is provided with orifices in a density of more than 100 orifices per m$^2$.

13. The reactor of claim 10, wherein the base plate of the tray is provided with orifices in a density of more than 100 orifices per m$^2$.

14. The device according to claim 1, wherein said chimneys have an internal diameter of from 25 mm to 80 mm.

15. The device according to claim 1, in which a number density of said chimneys is in the range from 30 to 100 per m$^2$.

16. The device according to claim 1, wherein a size of the particles in each layer is between 1 and 30 mm.

17. The reactor according to claim 10, wherein the particles of said at least one layer of particles of said filtration bed have a size which is less than or equal to the size of the catalyst particles of the fixed catalytic bed.

* * * * *